(12) United States Patent
Negishi et al.

(10) Patent No.: US 8,401,557 B2
(45) Date of Patent: Mar. 19, 2013

(54) MOBILE COMMUNICATION SYSTEM, ITS CONTROL DEVICE, AND HAND-OFF CONTROL METHOD

(75) Inventors: Kazuya Negishi, Fuchu (JP); Keiji Yamamoto, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 623 days.

(21) Appl. No.: 12/470,244

(22) Filed: May 21, 2009

(65) Prior Publication Data

US 2009/0291689 A1 Nov. 26, 2009

(30) Foreign Application Priority Data

May 22, 2008 (JP) ................................. 2008-134594

(51) Int. Cl.
*H04W 36/00* (2009.01)
(52) U.S. Cl. ........................................................ 455/436
(58) Field of Classification Search .......... 455/436–444; 370/331–334
See application file for complete search history.

(56) References Cited

U.S. PATENT DOCUMENTS

| | | | |
|---|---|---|---|
| 7,092,709 B1 * | 8/2006 | Honkala et al. ............. | 455/432.1 |
| 7,408,901 B1 * | 8/2008 | Narayanabhatla ............ | 370/331 |
| 2002/0107026 A1 * | 8/2002 | Agrawal et al. ............. | 455/453 |
| 2002/0181419 A1 * | 12/2002 | Zhang et al. .................. | 370/331 |
| 2004/0137901 A1 | 7/2004 | Hamasaki et al. | |
| 2005/0058099 A1 * | 3/2005 | Hernandez-Mondragon et al. ............................. | 370/331 |
| 2005/0143072 A1 * | 6/2005 | Yoon et al. .................... | 455/436 |
| 2006/0227744 A1 * | 10/2006 | Metke et al. .................. | 370/331 |
| 2008/0076434 A1 * | 3/2008 | Shigaki et al. ................ | 455/442 |
| 2009/0069015 A1 | 3/2009 | Yamamoto et al. | |

FOREIGN PATENT DOCUMENTS

| | | |
|---|---|---|
| CN | 101151913 A | 3/2008 |
| EP | 1 061 752 A1 | 12/2000 |
| EP | 1 460 874 A3 | 9/2004 |
| EP | 1 903 827 A2 | 3/2008 |
| JP | 2001-268619 | 9/2001 |

OTHER PUBLICATIONS

Combined Search and Examination Report under Sections 17 and 18(3) issued by the United Kingdom Patent Office on Aug. 17, 2009 (5 pages total).
Negishi, K. et al., "Mobile Communication System, Control Device Thereof, Mobile Terminal, and Database Constructing Method," U.S. Appl. No. 12/358,585, filed Jan. 23, 2009.
Official Action mailed Aug. 8, 2011 for Chinese Patent Application No. 200910203899.6.

* cited by examiner

*Primary Examiner* — Nathan Mitchell
(74) *Attorney, Agent, or Firm* — Finnegan, Henderson, Farabow, Garrett & Dunner, L.L.P.

(57) ABSTRACT

According to an embodiment of the present invention, a mobile communication system comprises a plurality of cellular stations configured to each form areas and a control device configured to connect the cellular stations to a network through communication resources. The control device comprises a construct processing module, a prediction processing module, a secure processing module and an establishment processing module. The construct processing module constructs a database storing hand-off records in time series of a plurality of the mobile terminals. The prediction processing module predicts one or more candidates of cellular stations of connection destinations next to the mobile terminals with reference to the time series of the database before hand-offs are requested. The secure processing module secures channels in the communication resources of the predicted candidates. The establishment processing module establishes communication links via the secured channels among the mobile terminals and the network when hand-off execution is requested.

24 Claims, 10 Drawing Sheets

| Cell station | Mobile terminal | Previous station | Station preceding previous station | ... |
|---|---|---|---|---|
| CS1 | PS1 | CS2 | CS3 | ... |
| | PS2 | CS3 | CS4 | ... |
| | PS3 | CS4 | CS5 | ... |
| | : | : | : | ... |
| CS2 | PS4 | CS1 | CS5 | ... |
| | : | : | : | ... |

| Previous station : CS2 | |
|---|---|
| Cell station : CS1 | |
| 100 | CS4 | → Delete oldest data
| 99 | CS5 |
| 98 | CS3 |
| 97 | CS3 |
| 96 | CS3 |
| ... | ... |
| 8 | CS4 |
| 7 | CS3 |
| 6 | CS4 |
| 5 | CS5 |
| 4 | CS3 |
| 3 | CS4 |
| 2 | CS3 |
| 1 | CS3 | ← Add new data 44b

FIG. 7

| | | Next station candidate | | | | |
|---|---|---|---|---|---|---|
| Present station | Previous station | First candidate | Second candidate | Third candidate | Fourth candidate | ... |
| | | Hand-off rate | Hand-off rate | Hand-off rate | Hand-off rate | ... |
| CS1 | CS2 | CS3 | CS4 | CS5 | - | ... |
| | | 55% | 25% | 20% | - | ... |
| | CS3 | CS5 | CS2 | CS4 | - | ... |
| | | 75% | 15% | 10% | - | ... |
| | CS4 | CS2 | CS3 | CS5 | CS6 | ... |
| | | 40% | 20% | 15% | 15% | ... |
| : | : | : | : | : | : | ... |
| CS2 | CS1 | CS4 | CS5 | CS3 | - | ... |
| | | 60% | 30% | 10% | - | ... |
| : | : | : | : | : | : | ... |

MOBILE COMMUNICATION SYSTEM, ITS CONTROL DEVICE, AND HAND-OFF CONTROL METHOD

CROSS-REFERENCE TO RELATED APPLICATIONS

This application is based upon and claims the benefit of priority from prior Japanese Patent Application No. 2008-134594, filed May 22, 2008, the entire contents of which are incorporated herein by reference.

BACKGROUND OF THE INVENTION

1. Field of the Invention

One embodiment of this invention relates to an improvement of a mobile communication system. More specifically, the present invention relates to switching of cellular stations accompanying inter-zone movement of mobile terminals, namely, relates to handover (hand-off).

2. Description of the Related Art

The mobile communication system provided with a plurality of cellular stations and a plurality of mobile terminals. Each cellular station is a facility on a network side, and individually forms a wireless zone (area, or cell). In each area, the mobile terminal communicates with a cellular station forming the area. A mobile terminal moving to another area switches a communication partner from a cellular station in connection to a cellular station at a movement destination. This processing is referred to as a hand-off.

The hand-off includes processing at an interface (wired resource) between the cellular station and the network, and processing at an interface (wireless resource) between the mobile terminal and the cellular station. Since any processing needs a certain extent of time, if the frequency of the hand-off increases, there is possibility that the processing will be behind time. For instance, before completion of the hand-off to the cellular station to be connected, the mobile terminal may move to the area of the further next cellular station. As the moving speed of the mobile terminal becomes faster, such a case is apt to occur. This situation is especially remarkable in a system of a micro cell system with a small cell radius. In such a case, since there is a risk that communication is disabled, it is forced to take prompt measures.

A technique to solve this kind of problem is disclosed in Jpn. Pat. Appln. KOKAI Publication No. 2001-268619. In this reference technique, the mobile terminal specifies the cellular station at the next hand-off destination on the basis of the previous hand-off record. After receiving the request from the mobile terminal, the network starts a hand-off process at the wired resource and the wireless resource. Therefore, the processing on the network side regarding the hand-off may be one step behind. If it is able to predict the cellular station of the hand-off destination on the network side, since a necessary process may be completed in advance, there is a possibility to further shorten the time required for the hand-off. However, such a technique has not been developed.

BRIEF SUMMARY OF THE INVENTION

As mentioned above, the development of such a technique, which shortens a time required for a hand-off so as to enable communication even if the hand-off occurs frequently, has been desired. An object of the invention is to shorten the time required to the hand-off.

Additional advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
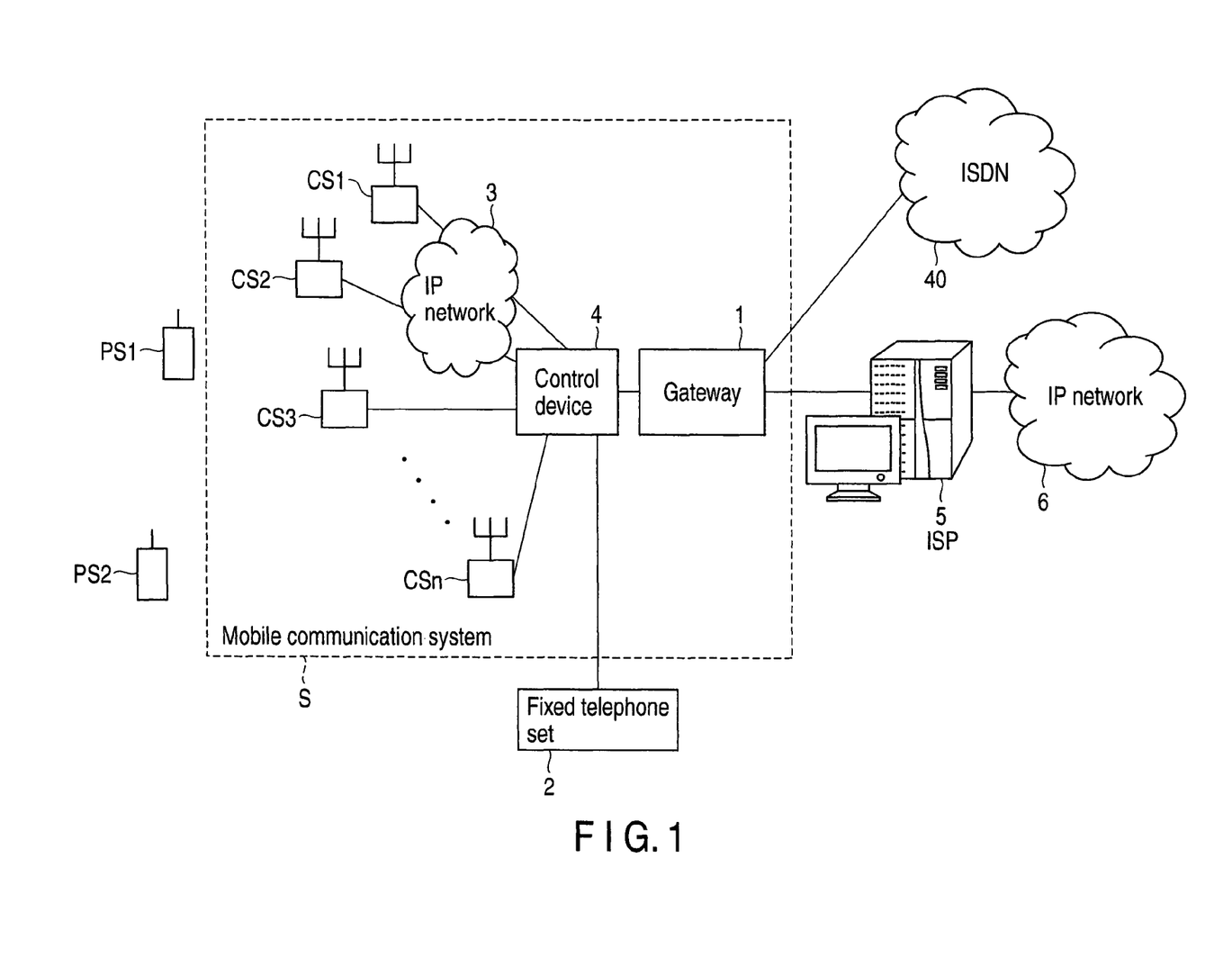
FIG. 1 is an exemplary system view depicting an embodiment of a mobile communication system of the invention.

FIG. 1 shows a system view illustrating an embodiment of a mobile communication system of the invention. A mobile communication system S is composed of a plurality of cellular stations CSs (CS1-CSn) and a control device 4 accommodating these cellular stations CS1-CSn through individual channels as a core. The individual channels are wired channels, Integrated Service Digital Network (ISDN) channels, or packet channels, etc. The packet channels may pass through an Internet Protocol (IP) network 3. It is convenient for the embodiment to unify protocols of the individual channels to the IP in an aspect of system implementation. Other than this, a fixed telephone set 2 may be connected to the control device 4.

The cellular stations CSs (CS1 to CSn) each form wireless areas and both mobile terminals PSs (PS1, PS2) are wirelessly connected to the cellular stations CS1-CS2 in any of areas. Of course, the number of the mobile terminals PSs is not limited to two. With movement among the wireless areas, the mobile terminals PSs implement hand-offs to switch in turn cellular stations of connection destinations.

The control device 4 is connected to a communication network through a gateway 1. The communication network is an exchange network such as an ISDN 40, and an IP network 6 through an Internet service provider (ISP). The IP network 6 is a packet communication network such as broad Ethernet (registered trademark) and an IP-virtual private network (IP-VPN) connection service. The gateway 1 has a protocol conversion function to connect these different networks to the communication system S.

Figure 2:
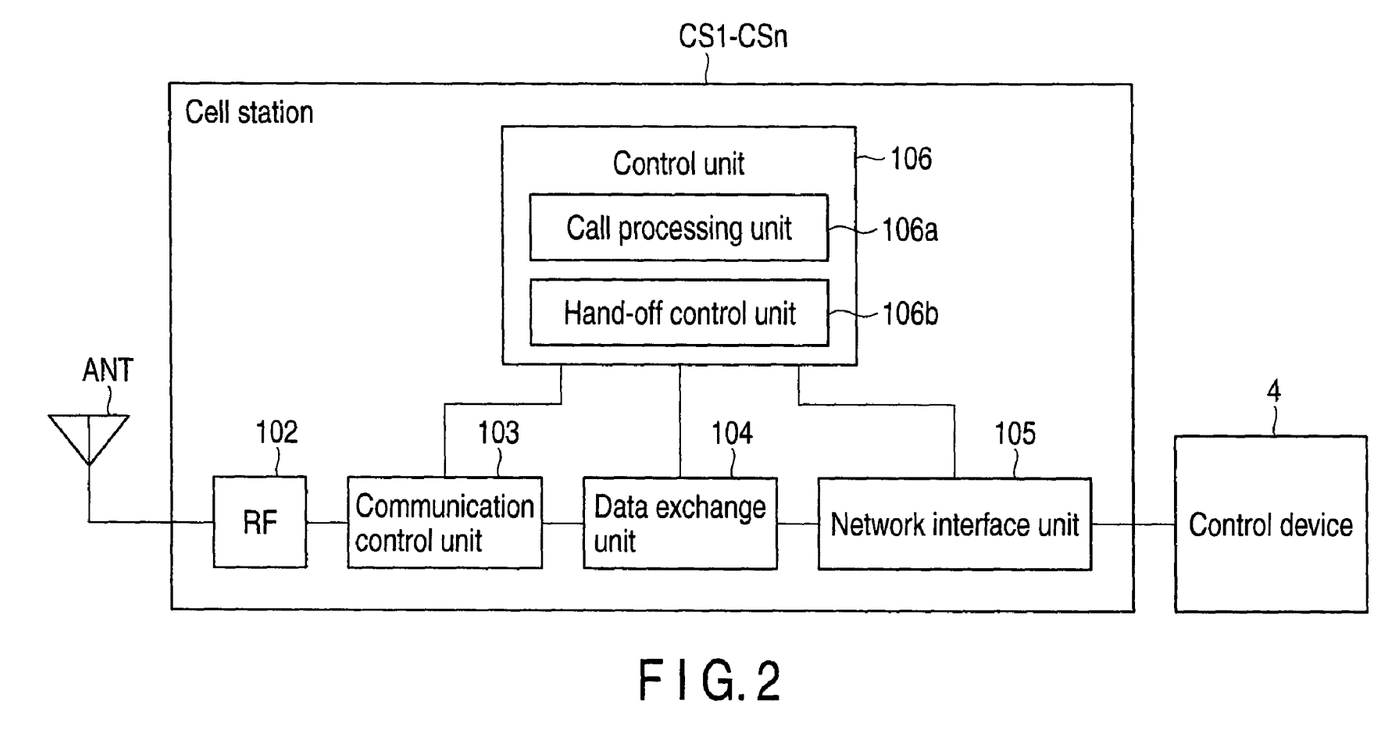
FIG. 2 is an exemplary functional block diagram depicting an example of a cellular station CS of FIG. 1.

FIG. 2 is a functional block diagram depicting each cellular station CS of FIG. 1. Each cellular station CS includes an antenna ANT, a radio frequency module (RF) 102, a communication control module 103, a data exchange module 104, a network interface module 105 and a control module 106.

The RF module 102 transmits and receives a radio signal of a high-frequency to and from the mobile terminals PSs through the antenna ANT. The control module 103 performs signal processing and control concerning wireless transmission and reception such as modulation and demodulation of communication data. The exchange module 104 performs multiplexing of transmission data and separation processing of reception data in accordance with a defined modulation system such as TDMA-TDD and OFDMA. The network interface module 105 is connected to the control device 4 through individual channels to conduct interface processing for connecting the cellular stations CSs and the mobile terminals PSs to the communication network.

The control module 106 has a call processing module 106a and a hand-off control module 106b. The call processing module 106a bears the entire control for connecting among the mobile terminals PSs and the calls to and from their partners. The hand-off control module 106b bears the entire control of hand-off accompanying the movements of the mobile terminals PSs.

Figure 3:
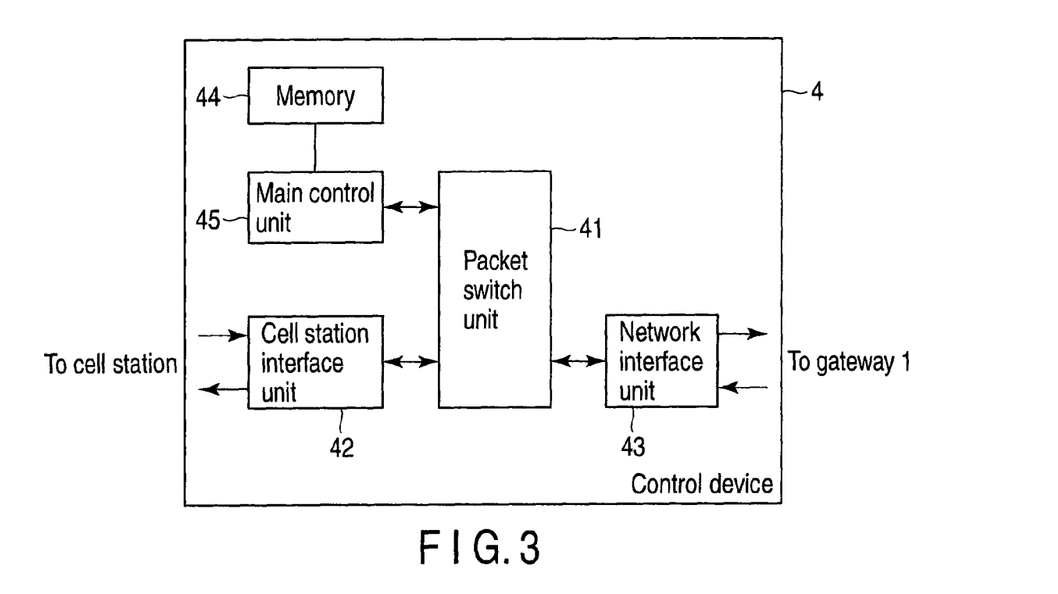
FIG. 3 is an exemplary block diagram depicting an example of a control device 4 of FIG. 1.

FIG. 3 shows a functional block diagram illustrating an example of the control device 4 of the FIG. 1. The control module 4 includes a packet switch module 41, a cellular station interface module 42, a network interface module 43, a memory 44 and a main control module 45. Among of them, the cellular station interface module 42 conducts interface processing for accommodating the cellular stations CS1-CSn through the individual channels. The network interface module 43 performs interface processing for connecting to the communication network through the gateway 1.

Both the cellular station interface module 42 and the network interface module 43 transmit and receive the packets to execute packet exchange by means of the packet switch module 41 disposed between the interfaces 42, 43. Various kinds of operations inside the devices including the packet exchange are integrally controlled by the main control module 45, and the program and each kind of setting data for the control are stored in the memory 44.

Figure 4:
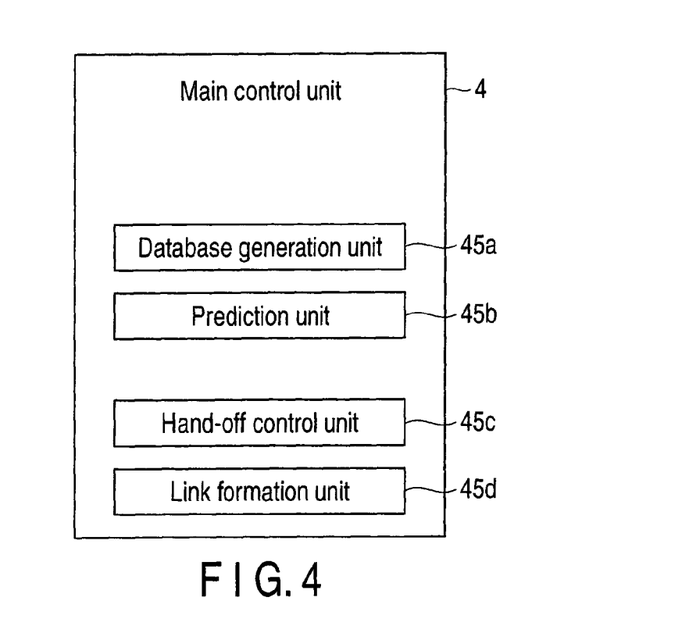
FIG. 4 is an exemplary block diagram depicting a function provided for a main control module 45 of FIG. 3.

FIG. 4 shows a block diagram illustrating the function provided for the main control module 45 of FIG. 3. The main control module 45 is provided with a database generation module 45a, a prediction module 45b, a hand-off control module 45c, and a link formation module 45d. All of these functions are processing functions to be achieved by computation processing by means of a central processing unit (CPU) on the basis of a command described in a program stored in the memory 44.

The database generation module 45a constructs a database so as to store the hand-off record of the mobile terminals PSs to store the database in the memory 44. The prediction module 45b predicts at least one candidate of a cellular station of a connection destination next to the mobile terminal PS with reference to the database before the hand-off is requested. The hand-off control module 45c receives a hand-off execution request from the mobile terminals PSs to perform processing concerning the whole of the hand-offs such as switching of connection destination cellular stations.

When receiving a hand-off execution request from the mobile terminals PS, the link formation module 45d establishes a communication link between the predicted next station and the control device 4. The mobile terminals PSs which have moved into the area of the next station are connected to the network through the link established in advance. In this way, forming a link by preceding the execution of the hand-off enables promoting acceleration of the hand-off without useless consumption of time as well as preventing disconnection of a call. This is one of merits which have obtained by enabling the cellular station of the hand-off destination to be predicted in the embodiment.

Figure 5:
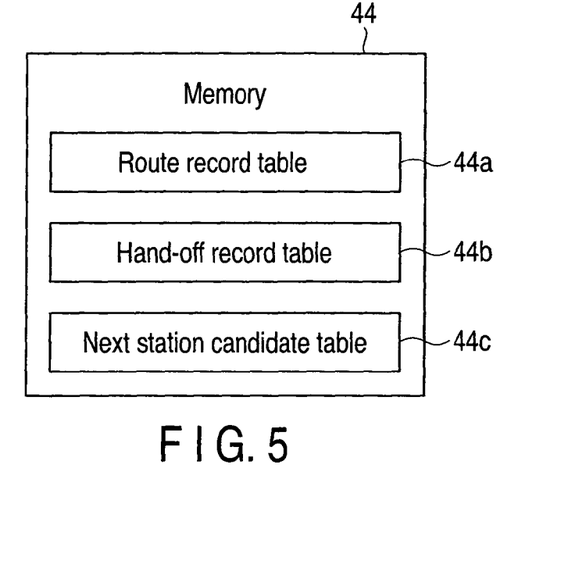
FIG. 5 is an exemplary view depicting a hand-off destination candidate table stored in a storage module of the control device 4 regarding one embodiment of the invention.

FIG. 5 shows a view illustrating an example of the database to be stored in the memory 44 of FIG. 3. The memory 44 stores a route record table 44a, a hand-off record table 44b, and a next-station candidate table 44c.

Figure 6:
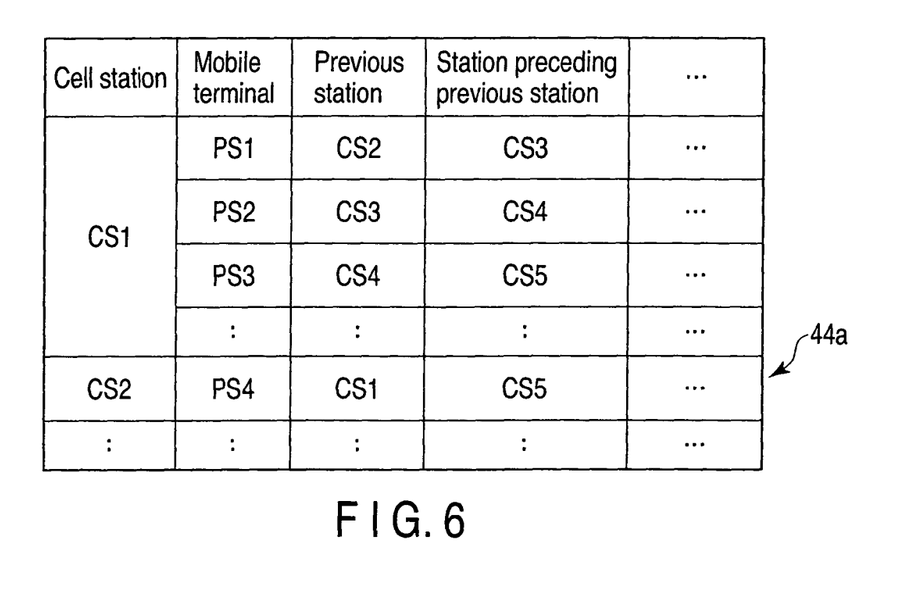
FIG. 6 is an exemplary view depicting a hand-off record table stored in the storage module of the control device 4 regarding the one embodiment of the invention.

FIG. 6 is a view illustrating an example of the route record table 44a of FIG. 5. Plainly speaking, the record table 44a is a database showing routes, through which each mobile terminal has moved, in time series of the connected cellular stations. The mobile terminal switches in turn the cellular stations of connection destinations with the repetition of the hand-off. The record table 44a tabulates the record of the connected cellular stations for each mobile terminal.

To simplify the following description, the cellular station that is a present connection destination for each mobile terminal is referred to as a "present station". The cellular station connected before this present station is referred to as a "previous station". Further, the cellular station connected before this "previous station" is referred to as a "station preceding previous station". For instance, as regards a mobile terminal which is now in connection to the cellular station CS1 at the present moment through the hand-off in order of the cellular stations CS3 and CS2, the cellular station CS1 is defined as the present station, and the cellular station CS2 is defined as the previous station, and the cellular station CS3 is defined as the station preceding the previous station. Further, the cellular station which is connected next to the present station by the mobile terminal is referred to the "next station". There are a plurality of candidates for the next station. Hereinafter, processing to specify a cellular station to be a candidate of the next station will be described.

In FIG. 6, mobile terminals PS1, PS2, PS3 are in communication with the cellular station CS1. In other words, the cellular station CS1 is the present station of the mobile terminals PS1, PS2, PS3. Among of the mobile terminals PS1-PS3, the previous station of the mobile terminal PS1 is the cellular station CS2, and the station preceding the previous station is the cellular station CS3. This situation shows that the mobile terminal PS1 is subjected to hand-off in accordance the route CS3→CS2→CS1.

Since any of the cellular stations CS1-CS3 is connected to the control device 4, the control device 4 can obtain a cellular station identification (ID) and a terminal ID regarding the hand-off every time the hand-off occurs. Tracing a time series of a cellular station ID for each terminal ID enables constructing the record table 44a.

Figure 7:
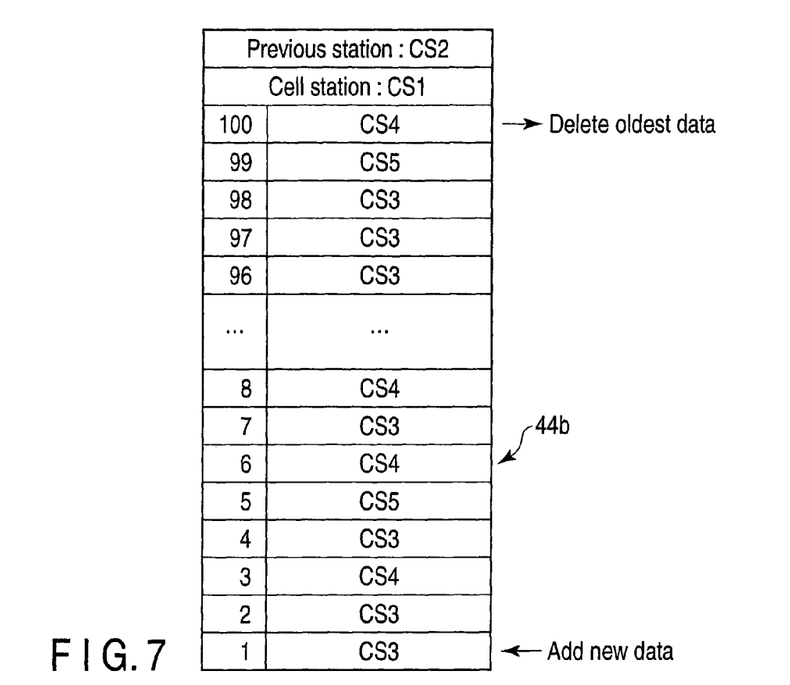
FIG. 7 is an exemplary view depicting a mobile terminal record table stored in the storage module of the control device regarding one embodiment of the invention.

FIG. 7 shows a view illustrating an example of the hand-off record table 44b of FIG. 5. The record table 44b may be constructed by the time series of the had-off record shown in the route record table 44a. For instance, all the mobile terminals which have handed off from the cellular station CS2 to the cellular station CS1 may not be handed off to the same cellular station next. FIG. 7 shows that the next connection destination (next station) of the mobile terminal which has handed off from the previous station CS2 to the cellular station CS1 has been any one of the cellular stations CS3, CS4, CS5.

That is, it becomes clear that most of the mobile terminals trace any one of routes of CS2→CS1→CS3, CS2→CS1→CS4, and CS2→CS1→CS5. The routes indicated a permutation of three cellular stations are appeared alternatively with storage of the records of the hand-offs. The hand-off record table 44b is a table arranging the permutation of the cellular stations generated with the record of the hand-offs in order of occurrence, and is dynamically updated with the lapse of time.

In the hand-off record table 44b, data areas, for instance, of one hundred corresponding to numeric FIGS. 1-100 are disposed. The lower number responds to newer data, and the oldest data is eliminated from the data areas. The cellular station CS3 is pooled in the newest data area; this means that the hand-off through the route of cellular stations CS2→CS1→CS3 has occurred at the latest time in the past. Even before the latest time, it becomes clear that the same route has been traced, and further before the time, it becomes clear that the route of the cellular stations CS2→CS1→CS4 has been traced. In this way, the hand-off record table 44b pools past hand-off records over a fixed times from the latest hand-off.

Figure 8:
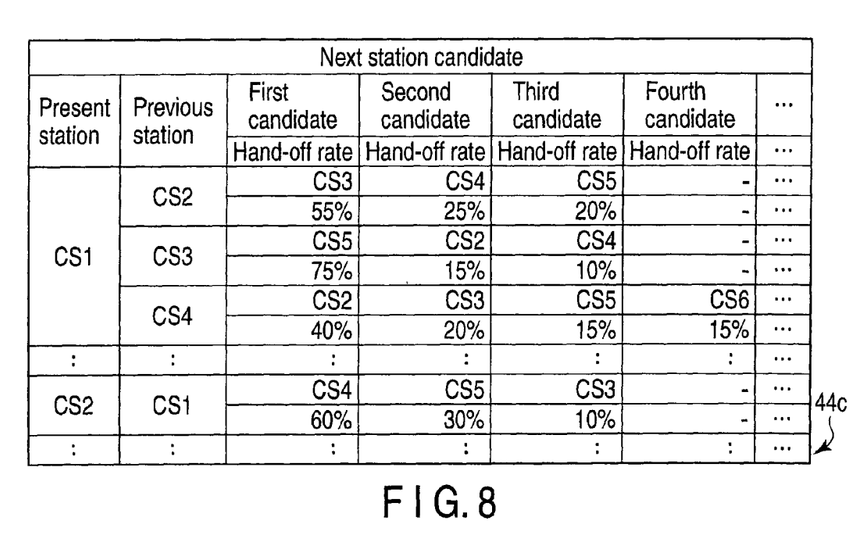
FIG. 8 is an exemplary view depicting radio wave intensity that is triggers to perform hand-offs and preparations of the hand-offs regarding one embodiment of the invention.

Here, focusing attention to the frequency of the occurrences of each route enables predicting the next station depending on the probability of the occurrences. For instance, according to the hand-off record table 44b of FIG. 7, it becomes clear that if the mobile terminal transits through cellular stations CS2→CS1, the next station is any one of the cellular stations CS3, CS4, CS5. Calculation of a rate in a population having one hundred elements enables calculating a transition probability from the cellular station CS1 to the cellular stations CS3, CS4 and CS5. FIG. 8 shows a table collecting up such a statistics amount.

FIG. 8 shows a view illustrating an example of the next station candidate table 44c of FIG. 5. The table 44c is a table in which the combinations of the previous station and the present station are associated with hand-off rates (transition probabilities) to a plurality of cellular stations which might possibly be the next stations. The transition probabilities are calculated from the data to be pooled in the hand-off record table 44b.

In FIG. 8, for example, the cellular stations (the next station candidates) with some possibilities that the mobile terminals which have handed off from the cellular station CS2 (previous station) to the cellular station CS1 (present station) hand off next are the cellular stations CS3, CS4, CS5, and the transition probabilities are 55%, 25%, 20%, respectively. These transition probabilities mean that the cellular stations CS3, CS4, CS5 are included in the rate of 55%, 25%, 20%, respectively, out of 100 items of the data in the record table 44b. Among of the cellular stations, the cellular station with the highest transition probability is the cellular station CS3; such a cellular station is called a first candidate. The next station candidates are arranged in descending order of the transition probability, in such order of a second candidate, a third candidate and so forth.

Similarly, as regards all the cellular stations CSs to be stored in the record table 44b, the transition probabilities are calculated to be recorded in the next station candidate table 44c. In the next station candidate table 44c, not the probabilities but the times of occurrences of hand-offs may be recorded. Since the number of items of data in the record table 44b is 100, the foregoing probabilities may be shown as 55, 25, and 20 as they are. In short, in the next station candidate table 44c, a permutation of a plurality of cellular stations, and a frequency generated with the record of hand-offs are recorded.

Figure 9:
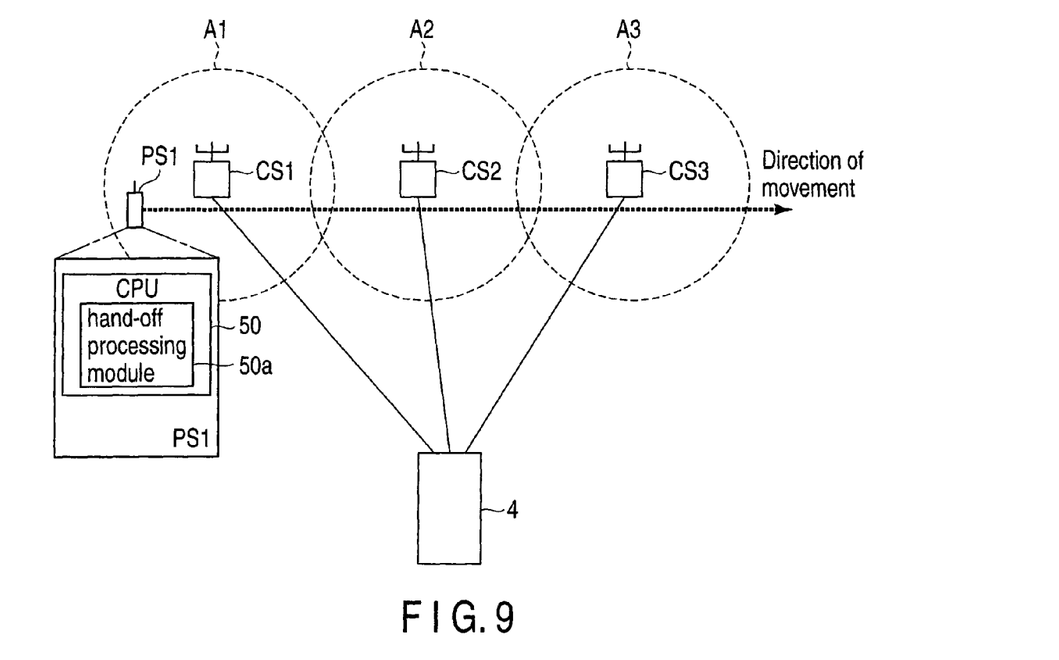
FIG. 9 is an exemplary sequence diagram depicting entire processing of a mobile communication system for selecting a cellular station of a hand-off destination regarding the embodiment of the invention.

FIG. 9 shows a view illustrating one example of a movement route of a mobile terminal. The cellular stations CS1, CS2, CS3 are connected to the control device 4 through a wired resource. Areas A1, A2, A3 are arranged adjacent to each other so as to overlap with each other. FIG. 9 shows a case in which the mobile terminal PS 1 moves from the area A1 to the area A2, and further moves to the area A3. If there is a record that the mobile terminal PS1 has handed-off from the area A1 to the area A2, it is predicted that the mobile terminal PS1 will hand off to the area A3 on the basis of its probability. Thus, in the embodiment, the mobile communication system prepares in advance to hand off from the cellular station CS2 to the cellular station CS3 before receiving the request from the mobile terminal PS1.

That is, the communication system predicts a cellular station (CS3) of a hand-off destination during communication of the mobile terminal PS1 with the cellular station CS2. Further, before the execution of the hand-off is required from the mobile terminal PS1, the communication system effects a communication link on a wired resource between the control device 4 and the cellular station CS3. Thus, if there is a necessary for the hand-off to the cellular station CS3, the control device 4 switches the cellular station for communicating with the mobile terminal PS1 from the cellular stations CS2 to CS3.

The establishment of a communication link means processing in order to secure a wired resource, namely a communication channel, for the mobile terminal PS1 which had been handing off. After requiring the hand-off to the communication system, the mobile terminal PS1 continues the communication using the secured communication channel.

In this way, during communication between the mobile terminal PS1 and the cellular station CS2, the communication channel of the wired resource is secured in this embodiment. Thereby, the secured communication channel makes it possible to reduce the time taken from the request for the hand-off up to the execution of the hand-off. For instance, processing to search another hand-off destination after becoming clear that no communication channel remains in the wired resource in execution of hand-off may be omitted. A fixed sequence is needed to start communication using the communication channel, and in the conventional method it is necessary to start the sequence from the request for the hand-off. In this embodiment, since the sequence may be completed before the request for the hand-off, the time needed for the hand-off may be reduced by the time of the sequence. As a result, even if the mobile terminal PS1 moves at high speed, the possibility of failure of hand-off may be reduced. That is, high-speed mobile performance of a mobile terminal may be enhanced.

Meanwhile, the mobile terminal PS includes a CPU 50. The CPU 50 includes the hand-off processing module 50a as its control function. For instance, if the reception level of the radio wave from the connection destination cellular station lowers than a certain value, the hand-off processing module 50*a* transmits a hand-off execution request requesting the execution of the hand-off to the control device 4. Further, in the embodiment, before transmitting the hand-off execution request, the hand-off processing module 50*a* transmits the hand-off preparation request to the control device 4. The hand-off preparation request and the hand-off execution request are message signals, for example, in formats of defined bit rows or control packets.

Figure 10:
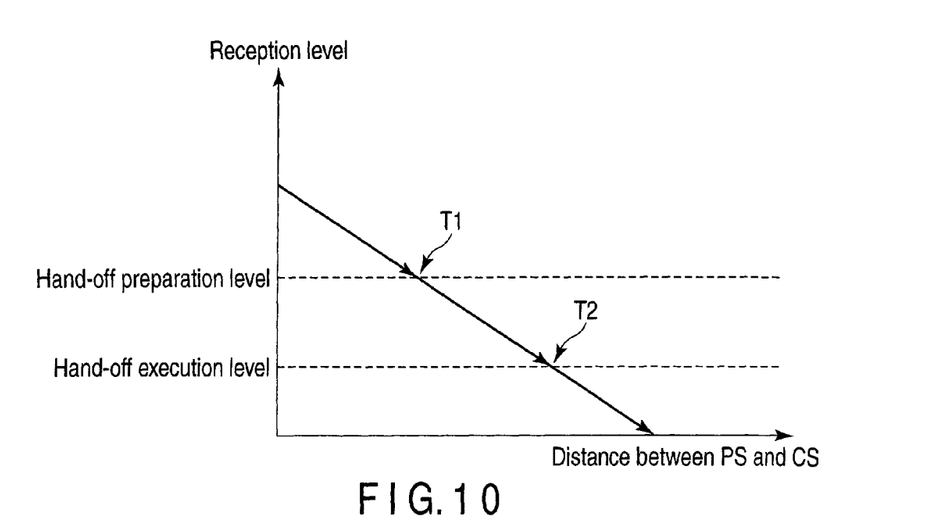
FIG. 10 is an exemplary flowchart depicting processing of the control device 4 for selecting a cellular station of a hand-off destination regarding the embodiment of the invention.

FIG. 10 shows a view illustrating relationships of the distance between the mobile terminal PS and the cellular station CS and the reception level of an radio wave at the mobile terminal PS. When the mobile terminal PS becomes away from the cellular station CS, since the radio wave intensity from the cellular station CS from which the mobile terminal PS receives the radio wave, the communication system has to implement the hand-off. In the conventional technique, when the reception level reaches a hand-off execution level (T2 in FIG. 10), the mobile terminal PS transmits a hand-off execution request to the cellular station CS. In the embodiment, in addition to this, when the reception level reaches a hand-off preparation level (T1 in FIG. 10), the mobile terminal PS transmits a hand-off preparation request to the cellular station CS. The hand-off preparation level is a little bit higher than the hand-off request level.

The hand-off preparation request reaches the control device 4 through the cellular station CS (present station) which has received this preparation request. The control device 4 which has received this preparation request selects the cellular station (next station) after the hand-off from the next station candidate table 44*c* of FIG. 8 to secure the communication channel at the wired resource of the next station. After this, when the hand-off execution request has reached the control device 4 through the present station, the hand-off using the secured communication channel is executed. Thereby, quick hand-off processing is achieved.

In FIG. 10, a vertical axis may be changed into the reception level of the radio wave from the mobile terminal PS in the cellular station CS. In such a case, while the cellular station CS voluntarily starts the preparation of the hand-off, there is no change that the preparation has been completed before the execution of the hand-off. More generally, the longitudinal axis of the graph may be changed into communication quality. The communication quality includes radio wave intensity, a signal-to-interface and noise power ration (SINR).

Next, operations in the configuration of the above will be described. Hereinafter, the operations will be described by diving into a case [first embodiment] in which the control device 4 selects one next station and a case [second embodiment] in which the control device 4 selects a plurality of next stations.

First Embodiment

Figure 11:
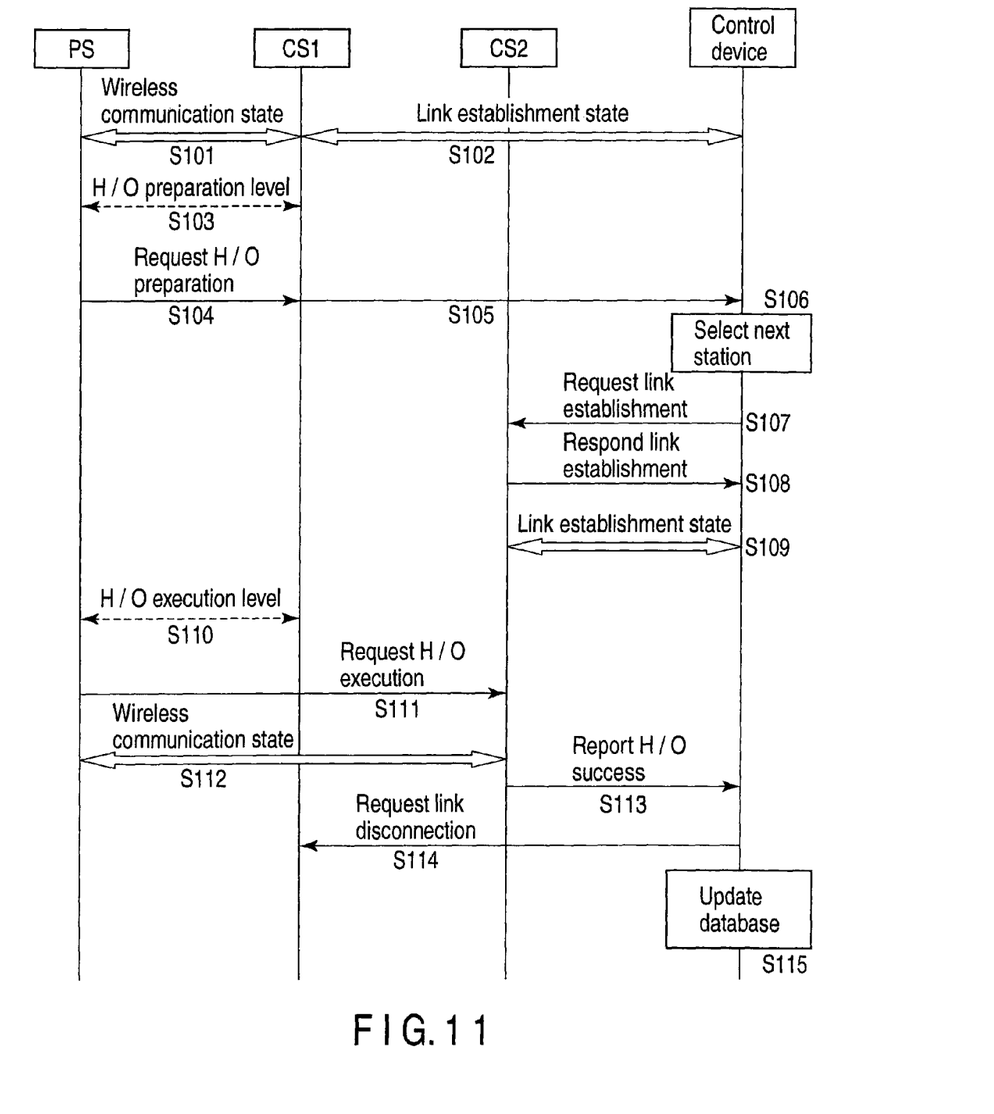
FIG. 11 is an exemplary sequence diagram depicting entire processing of a mobile communication system for selecting a cellular station of a hand-off destination regarding the embodiment of the invention.

FIG. 11 shows a sequence diagram illustrating a processing procedure regarding a first embodiment of the invention. FIG. 11 shows a case where the mobile terminal PS performs a hand-off (abbreviated as H/O) from the cellular station CS1 to the cellular station CS2.

In FIG. 11, the mobile terminal PS and the cellular station CS1 are in a wireless communication state (Step S101), and the communication link is effected between the cellular station CS1 and the control device 4 (Step S102). If the radio wave intensity received from the cellular station CS1 lowers to an H/O preparation level (Step S103), the mobile terminal PS transmits an H/O preparation request to the control device 4 through the cellular station CS1 (Steps S104, S105).

The control device 4, which has received the H/O preparation request, refers to the next station candidate table 44*c* to select on cellular station (next station) with the highest transition probability (Step S106). For instance, if the cellular station CS2 is selected, the control device 4 transmits a link establishment request to the cellular station CS2 (Step S107). The cellular station CS2 which has received the link establishment request transmits a link establishment response to the control device 4 (Step S108). Then, the system is brought into a state where the communication link is established between the cellular station CS2 and the control device 4 (Step S109).

From this state, if the reception level of the radio wave from the cellular station CS1 lowers to the H/O execution level (Step S110), the mobile terminal PS transmits the H/O request to the cellular station CS2 (Step S111). When the cellular station CS2 has received the H/O request, the communication link has been already established between the cellular station CS2 and the control device 4. Therefore, a wireless communication state is immediately established between the mobile terminal PS and the cellular station CS2 (Step S112).

When the wireless communication state becomes effective between the mobile terminal PS and the cellular station CS2, the cellular station CS2 transmits an H/O success report to the control device 4 (Step S113). The control device 4 which has received the H/O success report transmits a link disconnection request to the cellular station CS1 that is the previous station (cellular station which has communicated with the mobile terminal PS before hand-off) (Step S114). Finally, the control device 4 updates the next station candidate table 44*c*, the hand-off record table 44*b*, and the route record table 44*a* (Step S115).

Figure 12:
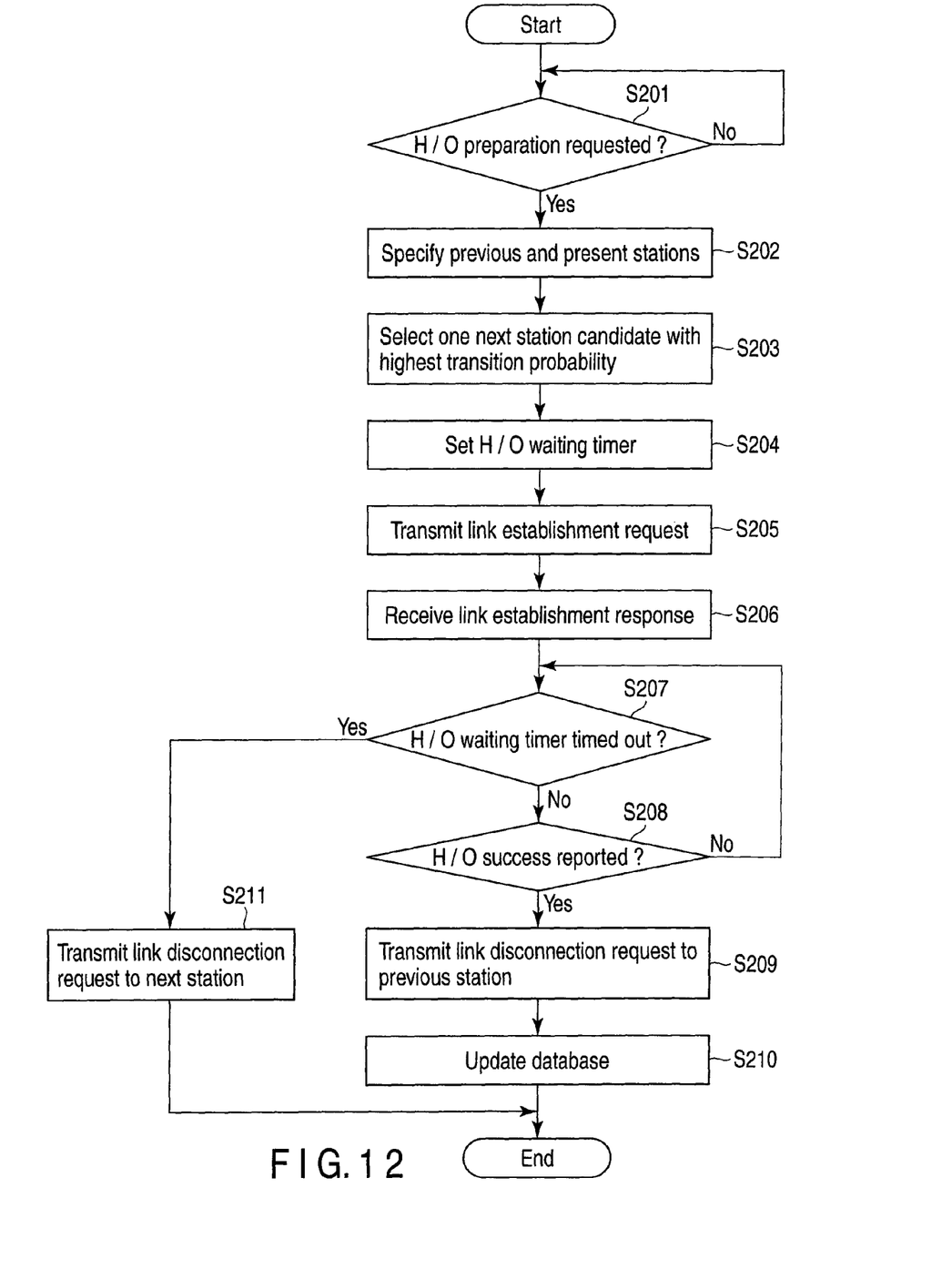
FIG. 12 is an exemplary flowchart depicting entire processing of the control device 4 for selecting a cellular station of a hand-off destination regarding the embodiment of the invention.

FIG. 12 shows a flowchart illustrating a processing procedure of the control device 4 in the sequence of FIG. 11. In FIG. 12, the control device 4 waits for the H/O preparation request (Step S201). When receiving the H/O preparation request, the control device 4 refers to the record table 44*a* to specify the previous station and the present station of the mobile terminal PS of the transmission origin of the preparation request (Step S202).

If the previous station and the present station become clear, the control device 4 refers to the next station candidate table 44*c* to select the cellular station CS with the highest hand-off possibility among the next station candidates corresponding to the combinations of the previous stations and the present stations (Step S203). In this step, one of the next station candidates is selected. Next, after setting an H/O waiting timer (Step S204), the control device 4 transmits the link establishment request to the next station candidate (Step S205). The link establishment request is received at the next station candidate, after the completion of link establishment processing, a link establishment response is returned, the control device 4 receives the link establishment response (Step S206).

Next, the control device 4 determines whether or not the H/O waiting timer has timed out (Step S207). Until the timer timed out, the control device 4 waits for the H/O success report (Step S208). The H/O success report includes not only the report which has been transmitted from the next station selected in Step S203, but also the report which has transmitted from another cellular station.

When receiving the H/O success report before the timeout, the control device 4 transmits the link disconnection request to the previous station (Step S209). After this, the control device 4 updates the route record table 44a, the hand-off record table 44b, and the next station candidate table 44c (correctively referred to a database) to end the processing (Step S210).

In Step S207, in a case where the H/O waiting timer has timed out, the control device 4 transmits a link disconnection request for disconnecting communication link which has formed in advance to the next station (Step S211) to end the processing.

In this way, in the first embodiment, every time the mobile terminal PS hands off, the records are recorded in the mobile terminal record table 44a. For each combination of the previous station and present station, the hand-off record table 44b counts the cellular stations which have become the next stations. Further, the transition probabilities which have calculated from the hand-off record table 44b are calculated to record the transition probabilities in the next station candidate table 44c. Each of the tables 44a, 44b, 44c are updated as the records of the hand-offs of the mobile terminal PS are stored.

That is, according to the embodiment, as the mobile terminal PS repeats hand-offs, the time-series of the cellular stations which have been connected is stored as a record. Based on the record, the control device 4 can predict the cellular station to which the mobile terminal PS hands off next. If the next station can be predicted, the system may complete the preparation before the hand-off request is issued from the mobile terminal PS. Namely, since the communication link may be formed in advance at the wired resource between the cellular station of the hand-off destination and the control device 4, the time from the hand-off request to the completion of the hand-off may be reduced. Therefore, even if the mobile terminal PS moves at high speed, the communication link may be accurately formed, and the risk of failure of the hand-off may be avoided.

In the conventional technique, to begin with, since the cellular station (next station) of the hand-off destination in future may not be predicted, establishing the communication link before the hand-off is disabled. Conversely, the embodiment may predict the next station, thus the communication link may be formed in advance. Since the control device 4 that is a facility on a system side constructs a database, the certainty of the prediction of the next station may be enhance in comparison with the storage of the hand-off record in the mobile terminal PS itself. In other words, even if the route through which no mobile terminal PS has not moved, surely predicting the next station can be implemented.

Further, in the embodiment, the number of the record data to be stored in the hand-off record table 44b is set to some extent (e.g., 100). If the number is too small, the precision of the prediction becomes lower; however, if the number is too large, it becomes hard to correspond to the reform of the system. That is, in the system objected to the invention, the cellular stations are setup and removed without designing a layout of the cellular stations. Changing the positional relationships of the cellular stations affects on the transition possibility to be recorded in the next station candidate table 44c. If the number of items of data in the hand-off record table 44b is too large, it takes a great deal of time for the change in transition probability due to the setup/removal of the cellular stations to reflect on the database. Thus, in the embodiment, the number of items of record data to be stored in the hand-off record table 44b is limited to around 100 items considered to be optimum. As regard the number of items, further optimum value will be found depending on the examination in future.

Second Embodiment

In the first embodiment, one next station with the highest transition probability in the next station candidate table 44c is selected as the next station. In the second embodiment, an example capable of enhancing the success ratio of hand-off by selecting a plurality of next station candidates will be disclosed.

Figure 13:
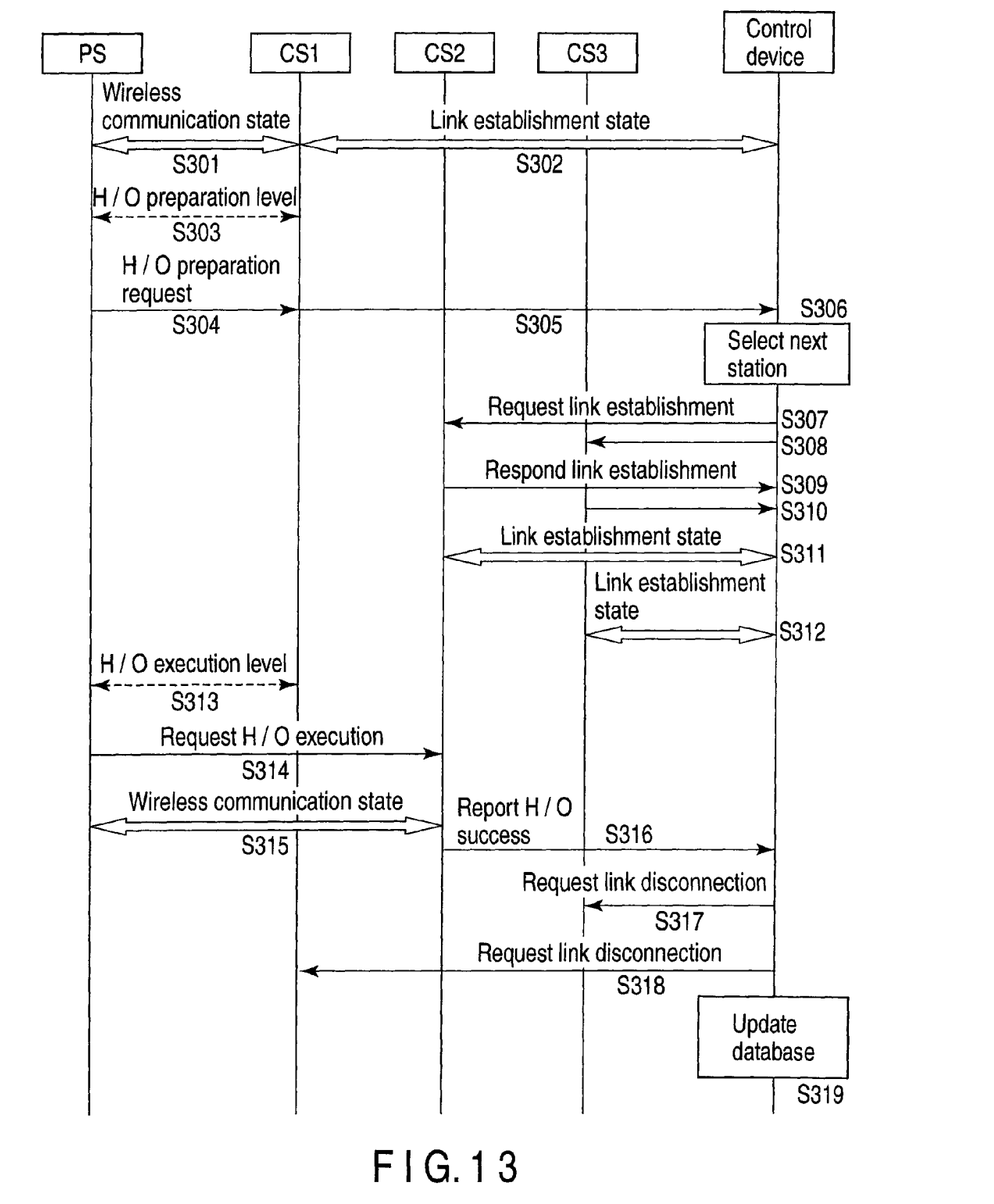
FIG. 13 is a sequence diagram illustrating a processing procedure regarding the second embodiment.

FIG. 13 is a sequence diagram illustrating a processing procedure regarding the second embodiment. In FIG. 13, Steps up to Steps S301-S305 are the same as those of FIG. 11. In Step S305 the control device 4 which has received the H/O preparation request refers the next station candidate table 44c to select a plurality of cellular stations in descending order of transition probability (Step S306). Here, for example, it is assumed that the cellular stations CS2, CS3 have been selected; however, the number is not limited to two, three or more may be accepted. The control device 4 transmits link establishment requests to the cellular stations CS2, CS3. (Steps S307, S308).

The cellular stations CS2, CS3 which have received the link establishment requests reply link establishment responses to the control device 4 (Steps S309, S310). Thereby, the communication system is brought into a state in which communication links are established, respectively, between the cellular station CS2 and the control device 4, and between the cellular station CS3 and the control device 4 (Steps S311, S312).

From this state, if the reception level of the radio wave from the cellular station CS1 is lowered to the H/O execution level (Step S313), the mobile terminal PS transmits the H/O request to either the predicted cellular station CS2 or CS3 (e.g., cellular station CS2) (Step S314). When the cellular station CS2 is received the H/O request, the communication link has been already established between the cellular station CS2 and the control device 4. Thus, the system is immediately brought into a wireless communication state between the mobile terminal PS and the cellular station CS2 (Step S315).

When the system is brought into the wireless communication state between the mobile terminal PS and the cellular station CS2, the cellular station CS2 transmits an H/O success report to the control device 4 (Step S316). The control device 4 which has received the H/O success report transmits a link disconnection request to the cellular station CS3 in order to disconnect the link formed to and from the cellular station CS3 (Step S317). Thereby, the wired resource of the cellular station CS3 is immediately released.

Next, the control device 4 transmits the link disconnection request also to the cellular station CS1 that is the previous station (Step S318). Finally, the control device 4 updates the next station candidate table 44c, the hand-off record table 44b, and the route record table 44a (Step S319).

Figure 14:
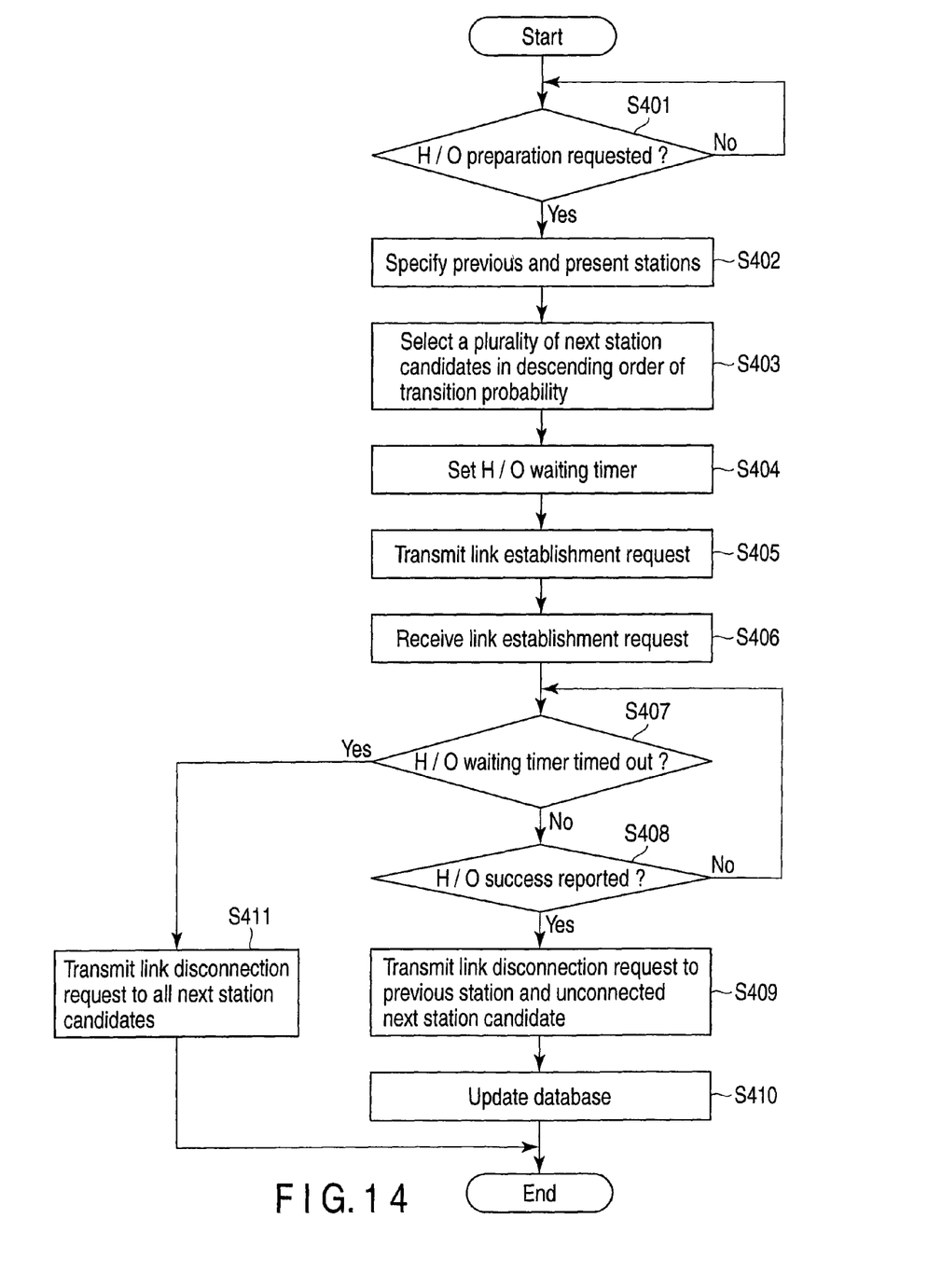
FIG. 14 shows a flowchart illustrating a processing procedure of the control device 4 in the sequence of FIG. 13.

FIG. 14 shows a flowchart illustrating a processing procedure of the control device 4 in the sequence of FIG. 13. In FIG. 14, the control device 4 waits for the H/O preparation request (Step S401). When receiving the H/O preparation request, the control device 4 refers to the route record table 44a to specify the previous and the present stations of the mobile terminal PS that is the transmission origin of the preparation request (Step S402).

If the previous and the present cellular stations become clear, the control device 4 refers to the next station candidate table 44c to select a plurality of cellular stations in descending order of hand-off probability among of next candidates corresponding to the combinations of the previous stations and the present stations (Step S403). Next, after setting the H/O waiting timer (Step S404), the control device 4 transmits the link establishment requests to the next station candidates (Step S405). These link establishment requests are received at the next station candidates, respectively, and link establishment responses are individually replied after the completion of the link establishment processing. The control device 4 receives these link establishment responses from each next station candidate (Step S406).

Next, the control device 4 determines whether or not the H/O waiting timer has timed out (Step S407). Until, the timer will time out, the control device 4 waits for the H/O success report (Step S408). When receiving the H/O success report from any of the next station candidates before time-out, the control device 4 transmits the link disconnection request to the previous station, and the cellular stations which have not handed off among the plurality of next stations, respectively (Step S409). After this, the control device 4 updates the route record table 44*a*, the hand-off record table 44*b* and the next station candidate table 44*c* (collectively referred to as database) to end the processing (Step S410).

In Step S407, in a case where the H/O wait timer has timed out, the control device 4 transmits link disconnection requests for disconnecting the communication link formed in advance to all the next station candidates (Step S411) to end the processing.

As mentioned above, in the second embodiment, a plurality of candidates of cellular stations to be hand-off destinations are selected, and all the wired resources related to the cellular stations are secured before the hand-off execution. Thereby, the success ratio of the hand-off may be improved, and resistance property of the system against the high-speed movement of the mobile terminal PS may be improved.

The invention is not limited to the foregoing embodiments, various modifications may be embodied. For instance, in the hand-off record table 44*b* in FIG. 7, while only the combinations of the previous stations and the present stations store the records of the next stations, the invention is not limited to the embodiments; the database may be constructed by trace back to the past cellular stations. Namely, the next stations may be recorded to the permutation composed of the station preceding previous station, the previous station and the present station, and the next stations may be recorded to a permutation composed of further large number of cellular stations.

The route record table 44*a* is stored in the control device 4. Instead of this, the mobile terminal itself may store route information showing its own movement record, and may report the route information to the control device 4 together with the hand-off preparation request. Further, for selecting the next station candidate, an occupation situation of a resource (wired, not wired) at each next station candidate may be considered.

In the invention, the control device 4 may combine the mobile terminal PS with a technique instructing the hand-off destination. Thereby, the processing not only related to the wired resource between the cellular station CS and the control device 4, but also related to the wireless resources between the mobile terminal PS and the cellular station CS may be accelerated.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A mobile communication system comprising:
   a plurality of cellular stations configured to each form areas; and
   a control device configured to connect the cellular stations to a network through communication resources; wherein the control device comprises:
   a construct processing module configured to construct a database storing hand-off records in time series of a plurality of mobile terminals;
   a prediction processing module configured to predict one or more candidates of cellular stations of connection destinations next to the mobile terminals with reference to the time series of the database before hand-offs are requested;
   a secure processing module configured to secure channels in the communication resources of the predicted candidates; and
   an establishment processing module configured to establish communication links via the secured channels among the mobile terminals and the network when hand-off execution is requested.

2. The system of claim 1, wherein
the database, further comprises:
   a next station candidate table associating a frequency of transitions to cellular stations which might possibly be the candidates with each permutation, wherein
   the prediction processing module is further configured to predict the candidates on the basis of the frequency in the next station candidate table.

3. The system of claim 2, wherein
the database, further comprises:
a hand-off record table configured to store a fixed number of permutations of the cellular stations that occurred in the time series in order of occurrence, wherein
the construct processing module is further configured to construct the next station candidate table on the basis of the hand-off record table.

4. The system of claim 2, wherein
the database, further comprises:
a route record table in which a time series of cellular stations connected with hand-offs is recorded for each mobile terminal.

5. The system of claim 1, wherein
the prediction processing module is further configured to predict the candidates when receiving preparation requests requesting preparations of the hand-offs; and
the secure processing module is further configured to secure the channels when receiving the preparation requests.

6. The system of claim 5, wherein
the establishment processing module is further configured to establish the communication links when receiving execution requests requesting execution of the hand-offs.

7. The system of claim 2, wherein
the prediction processing module is further configured to predict the candidates referring to the next station candidate table on the basis of the time series reported from the mobile terminal of cellular stations connected with their own hand-offs.

8. The system of claim 3, wherein
the hand-off record table sets an upper limit of a number of items of data which is stored in the hand-off record table.

9. A control device configured to connect a plurality of cellular stations to a network through communication resources, comprising:
   a construct processing module configured to construct a database storing hand-off records in time series of a plurality of mobile terminals;
   a prediction processing module configured to predict one or more candidates of cellular stations of connection destinations next to the mobile terminals with reference to the time series of the database before hand-offs are requested;

a secure processing module configured to secure channels in the communication resources of the predicted candidates; and an establishment processing module configured to establish communication links via the secured channels among the mobile terminals and the network when hand-off execution is requested.

10. The device of claim 9, wherein
the database further comprises:
a next station candidate table associating a frequency of transitions to cellular stations which might possibly be the candidates with each permutation, wherein
the prediction processing module is further configured to predict the candidates on the basis of the frequency in the next station candidate table.

11. The device of claim 10, wherein
the database, further comprises:
a hand-off record table configured to store a fixed number of permutations of the cellular stations that occurred in the time series in order of occurrence, wherein
the construct processing module is further configured to construct the next station candidate table on the basis of the hand-off record table.

12. The device of claim 10, wherein
the database, further comprises:
a route record table in which a time series of cellular stations connected with hand-offs is recorded for each mobile terminal.

13. The device of claim 9, wherein
the prediction processing module is further configured to predict the candidates when receiving preparation requests requesting preparations of the hand-offs; and
the secure processing module is further configured to secure the channels when receiving the preparation requests.

14. The device of claim 9, wherein
the establishment processing module is further configured to establish the communication links when receiving execution requests requesting execution of the hand-offs.

15. The device of claim 10, wherein
the prediction processing module is further configured to predict the candidates referring to the next station candidate table on the basis of the time series reported from the mobile terminal of cellular stations connected with their own hand-offs.

16. The device of claim 9, wherein
the hand-off record table sets an upper limit of a number of items of data which is stored in the hand-off record table.

17. A hand-off control method to be applied to a mobile communication system, the mobile communication system comprising a plurality of cellular stations configured to each form areas and a control device configured to connect these cellular stations to a network through communication resources, the method comprising:

requesting hand-offs by which mobile terminals move among areas to the control device;

constructing a database in which the control device stores hand-off records in time series of a plurality of the mobile terminals;

predicting by the control device one or more candidates of cellular stations of connection destinations next to the mobile terminals with reference to the time series of the database before hand-offs are requested;

securing channels by the control device in the communication resources of the predicted candidates; and establishing communication links via the secured channels among the mobile terminals and the network when execution of a hand-off is requested by the control device.

18. The method of claim 17, wherein
the database further comprises:
a next station candidate table associating a frequency of transitions to cellular stations which might possibly be the candidates with each permutation, and
the control device predicts the candidates on the basis of the frequency in the next station candidate table.

19. The method of claim 18, wherein
the database further comprises:
a hand-off record table configured to store a fixed number of permutations of the cellular stations that occurred in the time series in order of occurrence, and
the control device constructs the next station candidate table on the basis of the hand-off record table.

20. The device of claim 18, wherein
the database further comprises:
a route record table in which a time series of cellular stations connected with hand-offs is recorded for each mobile terminal.

21. The method of claim 17, wherein
the control device predicts the candidates when receiving preparation requests requesting preparations of the hand-offs; and
the control device secures the channels when receiving the preparation requests.

22. The method of claim 21, wherein
the control device establishes the communication links when receiving the execution requests requesting execution of the hand-offs.

23. The method of claim 20, wherein
the control device predicts the candidates referring to the next station candidate table on the basis of the time series reported from the mobile terminal of cellular stations connected with their own hand-offs.

24. The system of claim 19, wherein
the hand-off record table sets an upper limit of a number of items of data which is stored in the hand-off record table.

* * * * *